Jan. 14, 1936.  R. ERLING  2,028,089
CONTROL FOR HYDRAULIC STEERING GEARS
Filed Sept. 29, 1932  2 Sheets-Sheet 2
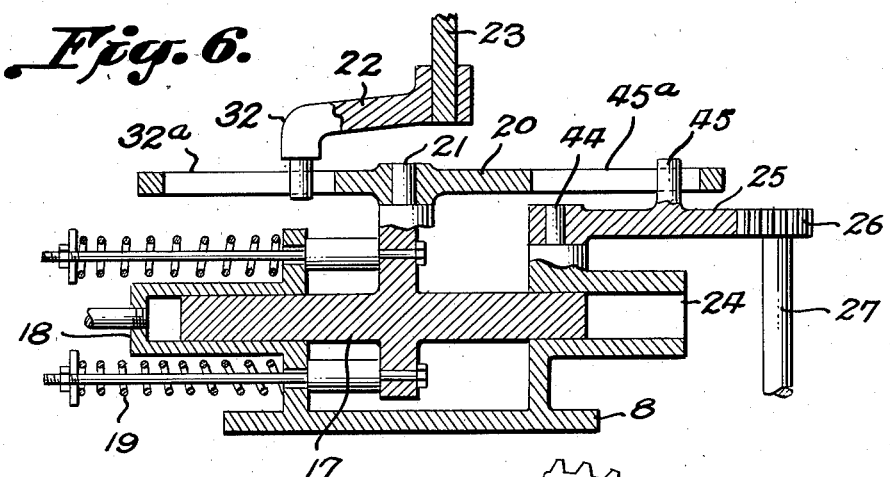
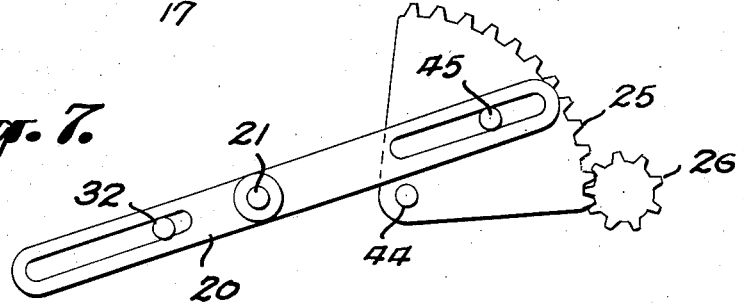
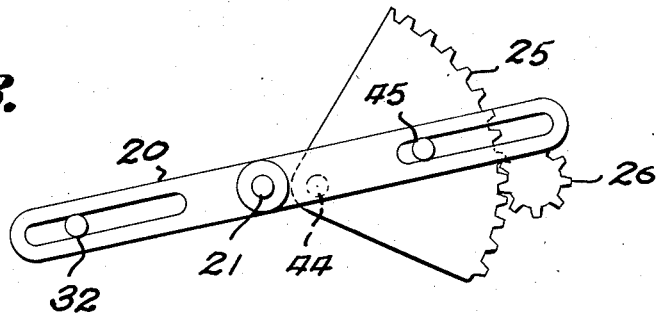
INVENTOR -
RALPH ERLING.
BY Harold Dodd
ATTORNEY.

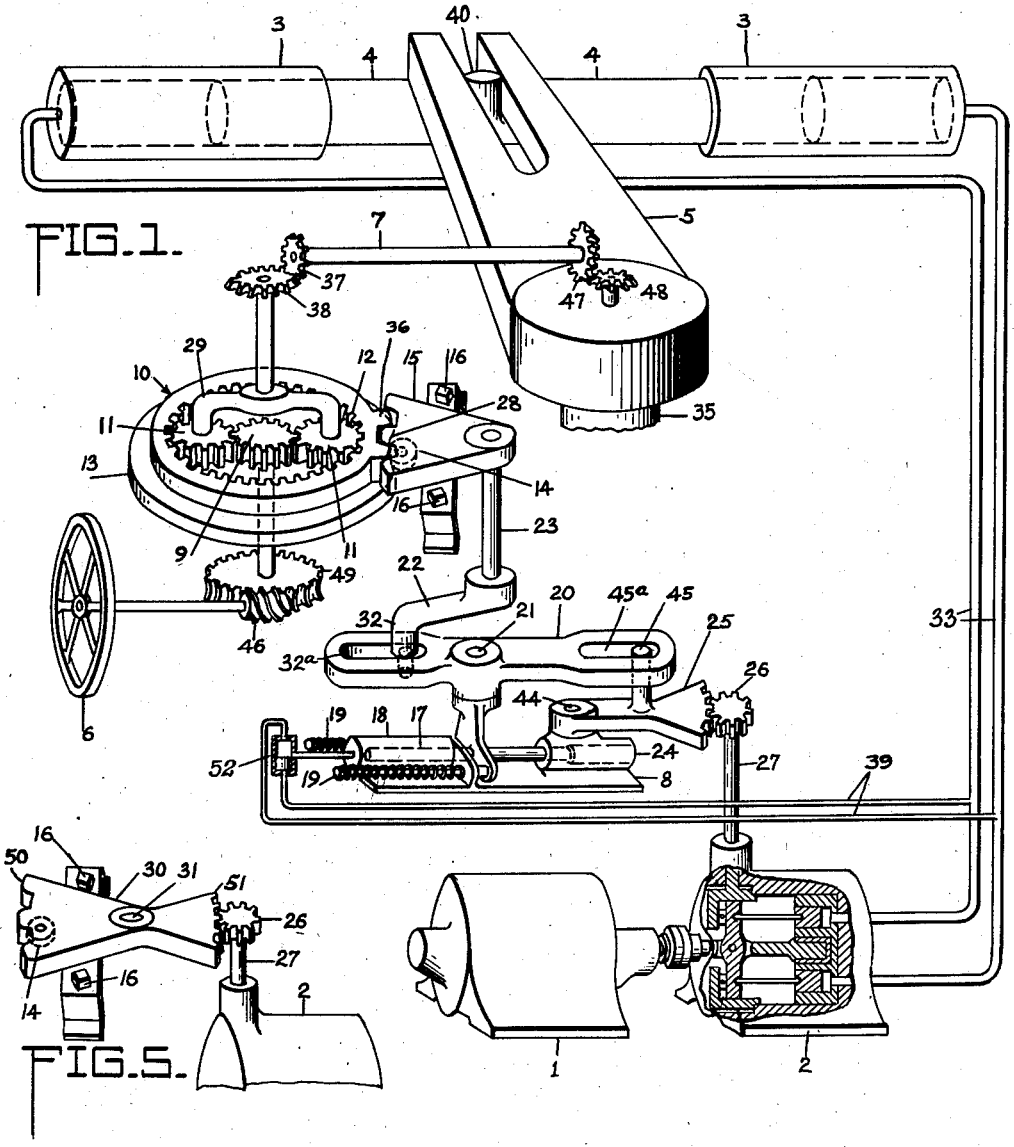

Patented Jan. 14, 1936

2,028,089

UNITED STATES PATENT OFFICE 2,028,089

CONTROL FOR HYDRAULIC
STEERING GEARS

Ralph Erling, Alexandria, Va.

Application September 29, 1932, Serial No. 635,379

22 Claims. (Cl. 60—52)

(Filed but not issued under the act of March 3,
1883, as amended April 30, 1928; 370 O. G. 757)

This invention relates to mechanism for use with hydraulic steering gears for ships.

One object of this invention is to devise means to permit the wheel to be put over to any desired rudder angle without interference by the follow-up and to control the output of the pump to secure the delivery of oil at a pressure never in excess of a predetermined maximum.

A further object is to provide means that will render any type of torque amplification mechanism unnecessary.

A further object is to prevent injury to the pump control in case of casualty to any other part of the steering gear under all conditions.

A further object is to provide a rotary storage of the motion of either the steering wheel or follow-up without employing springs.

A still further object is to prevent the load placed upon the motor that drives the hydraulic mechanism from exceeding a predetermined value.

With the above and other objects in view, the invention consists in the construction, combination and arrangement of parts as will be described more fully hereinafter.

Figure 1 is a schematic assembly view of a steering gear embodying my invention.

Figures 2, 3, and 4 are details of a gear segment and gear sector forming a part of my invention.

Figure 5 is a view of my invention used without a torque equalizer.

Figure 6 is a sectional detail view taken along the axis of the torque equalizer cylinder.

Figures 7 and 8 are views showing my novel lever of variable effective length, with the lever and associated parts in two different positions.

The motor 1 drives a continuously operating variable delivery pump 2 that supplies oil under pressure to ram cylinders 3 through pipes 33. The rams 4 carry a lug 40 that is slidable in the rudder cross-head 5 which in turn is connected to the rudder post 35.

Steering wheel 6 is connected to a worm 46 that is meshed with a worm gear 49 mounted on the same shaft as sun pinion 9. The sun pinion is meshed with planet pinions 11 that engage internal ring gear 12 forming a differential 10. Gear 48, fixed to rudder cross-head 5 concentrically with rudder post 35, is meshed with gear 47 mounted on the same shaft 7 as gear 37, which last mentioned gear is meshed with gear 38 on a shaft carried by the fork 29 that has a planet pinion 11 rotatably mounted on each of its branches. The mechanism heretofore described is well known.

Peripherally of ring gear 12 is a gear segment shown as having two teeth 36, although a greater number may be used as desired. A circular track 13 is fixed to ring gear 12 and has an indentation 28 disposed with its deepest portion substantially midway between the teeth 36. A gear sector 15, shown as having three teeth, is adapted to mesh with the teeth 36 at certain positions of the mechanism. The gear sector is carried by a rotatably mounted shaft 23 that has at its other end a crank arm 22 with a laterally turned portion 32. Stops 16 are provided to prevent unduly great rotation of the gear sector 15.

A lever 20 having elongated slots 45a and 32a in its ends is mounted intermediate its ends upon a fulcrum 21 carried by plunger 17 of torque equalizer 8 that is slidable in the cylinder 18. Springs 19 load the equalizer to prevent movement of the plunger outwardly from the cylinder until a predetermined pressure has been set up in pipes 33 to which the cylinder 18 is connected by pipes 39. A shuttle valve 52 permits passage of oil to cylinder 18 from that one of pipes 33 in which the pressure is higher but prevents communication between the pipes 33. Upon pin 44 on plunger guide 24 is pivotally mounted one end of a gear sector 25 having a laterally extending pin 45 disposed in the slot 45a and having its teeth meshed with the pinion 26 on shaft 27 that controls the output of pump 2. Laterally turned portion 32 of the arm 22 is slidable in the slot 32a.

When wheel 6 is turned in either direction planet pinions 11 are driven by sun pinion 9 and in turn the planet pinions drive ring gear 12, which rotation of the ring gear causes gear sector 15 to be turned and if the rotation of ring gear 12 be sufficient the teeth of sector 15 will be completely disengaged from the teeth 36 which adjusts the pump 2 to deliver its maximum output of oil. Wheel 6 can then be turned to any degree necessary to produce the desired rudder angle, the parts of pump 2 being held in the maximum output setting by a roller 14 mounted in sector 15 riding on track 13 and so tends to maintain the controls in the open position.

It is apparent that rotation of sector 15 will turn shaft 23 and thereby turn arm 22 which will rotate lever 20 about its fulcrum thus moving gear sector 25 on its pivot and driving pinion 26 to operate the pump control.

After the pump begins delivering oil the pressure in pipes 33 is built up and is transmitted to cylinder 18 but does not affect the operation of the device until the predetermined pressure has been reached, whereupon plunger 17 is moved outwardly from cylinder 18, which also moves lever 20 and thus lengthens the distance between member 32 and fulcrum 21 and correspondingly diminishes the distance between the fulcrum and pin 45, giving a greater mechanical advantage to manipulate the pump control. It is apparent also that as the plunger 17 moves outwardly the angle between the axis of plunger 17 and the longitudinal axis of lever 20 will be diminished due to the member 32 which is engaged in slot 32a being at the time off center from fulcrum 21 about which the entire lever 20 will turn, and therefore the control of the pump will be slightly closed and the rate of oil delivery from the pump reduced. This action allows for higher oil pressures with less quantity of oil being delivered and hence limits the load that can be put upon the motor.

Fig. 7 shows the relative position of the end of member 32, lever 20, fulcrum 21, and pin 45 when the pressure in the pump 2 is less than the pre-determined maximum and the distance from member 32 to fulcrum 21 is small as compared with the distance of pin 45 from the same fulcrum, which will result in a relatively large angular movement of the said pin when the member 32 moves through a small angle. In Fig. 8 the pressure has moved plunger 17 farther out of cylinder 18, relatively increasing the distance from member 32 to fulcrum 21 and decreasing the distance from the fulcrum to pin 45, which will cause a smaller angular movement of the pin for a given degree of rotation of member 32. It is obvious that when member 32 remains fixed and fulcrum 21 is moved toward or from that member, lever 20 will be rotated on the fulcrum and will actuate the control 27 to put stroke on, or to reduce the stroke of, pump 2, due to necessary changes in the angle between the median longitudinal line of the lever and a line through the centers of fulcrum 21 and pivot 44.

As rudder cross-head 5 is moved by the rams 4 the gear 48 will rotate in the same direction as rudder post 35, thus actuating the follow-up mechanism consisting of gear 47, shaft 7, and gears 37 and 38 which will rotate the planet pinions about sun pinion 9 and so will drive ring gear 12 in the direction opposite to that in which it was moved by the wheel 6. This rotation of ring gear 12 through the follow-up will continue until the teeth 36 have again engaged the teeth of gear sector 15 and moved the gear sector to the neutral position with roller 14 seated in the deepest portion of indentation 28 at which time the control of the pump will have been returned to neutral and no pressure will be applied to the rams even though the motor 1 operates continuously.

Figure 2 shows the roller 14 riding on track 13 just outside indentation 28;

Figure 3 shows the parts in neutral position with the roller 14 seated in the indentation 28;

Figure 4 is a longitudinal section of gear sector 15 showing roller 14 seated in the indentation 28.

Figure 5 shows a modified form of my invention applicable when a torque equalizer is not used. Instead of a gear sector having teeth at one end only, like sector 15, in this case there is a double gear sector 30 pivotally mounted at 31 having at one end teeth 50 to engage the teeth 36 on ring gear 12 and at the other end teeth 51 to engage pinion 26.

Due to the mechanical relation of parts 12 and 15 and the automatic action of the torque equalizer 8, the force necessary to turn wheel 6 is limited to that required to overcome the torque on control shaft 27 at the predetermined oil pressure and so eliminates the necessity for any torque amplification means. Further, since the pump control is completely opened by a relatively small rotation of ring gear 12 and thereafter further rotation of the ring gear does not affect the pump, the helmsman can put the wheel over to any desired rudder angle, while at the same time the delivery of the oil to the rams is kept constant and thus the time required to move the rudder to any desired angle is decreased.

The invention described herein may be manufactured and used by or for the Government of the United States of America for governmental purposes without the payment of any royalty thereon.

I claim:

1. In combination with steering gear that includes a rudder post and hydraulic pump operating means therefor, said pump having controls to vary the quantity and direction of flow of liquid therefrom, a sun pinion, a steering wheel operatively connected to said pinion, planet pinions engaging with said sun pinion, a ring gear meshed with said planet pinions, external gear teeth on said ring forming a gear segment, a circular track secured to said ring, said track having an indentation aligned with the median portion of said gear segment, a rotatable shaft, a first gear sector mounted on said shaft to be engageable with said gear segment, a roller carried by said sector to seat in said indentation when the sector is in the neutral position, a crank arm mounted on said shaft a torque equalizer having a slidable plunger operatively connected to said pump, spring means to prevent movement of said plunger at fluid pressures below a predetermined magnitude, a fulcrum carried by said plunger, a lever having two slotted ends mounted on said fulcrum intermediate its ends, a laterally extending portion of said crank arm being disposed in a slot in one end of said lever, a second gear sector pivotally mounted at one of its ends adjacent the other end of said slotted lever, a pin connected to said second gear sector disposed in the slot in said other end, a pinion meshed with said second sector, said pinion being connected to vary the quantity or direction of flow of liquid from said pump, and means connecting said rudder post to said planet pinions whereby rotation of said post actuates said gear sectors to stop the flow of liquid from said pump after a predetermined degree of rotation of said post.

2. In combination with steering gear that includes a rudder post and hydraulic pump operating means therefor, said pump having controls to vary the quantity and direction of flow of liquid therefrom, a steering wheel, differential mechanism operatively connected to said wheel, a gear segment connected to be rotated by said mechanism, a circular track connected to said mechanism and having an indentation therein aligned with the median portion of said segment, a rotatable shaft, a first gear sector mounted on said shaft to be engageable with said gear segment, a roller carried by said sector to seat in said indentation when the sector is in the neutral position, a crank arm mounted on said shaft, a torque equalizer having a slidable plunger operatively connected to said pump, spring means to prevent movement of said plunger at fluid pressures below a predetermined magnitude, a fulcrum carried by said plunger, a lever having two slotted ends mounted on said fulcrum intermediate the ends of the lever, a laterally extending portion of said crank arm being disposed in a slot in one end of said lever, a second gear sector pivotally mounted at one of its ends adjacent the other end of said slotted lever, a pin connected to said second gear sector disposed in the slot in the said other end, a pinion meshed with said second sector, said pinion being connected to vary the quantity or direction of flow of liquid from said pump, and means connecting said rudder post to said differential mechanism whereby rotation of said post actuates said differential mechanism and thereby operates said gear sectors to stop the flow of liquid from said pump after a predetermined degree of rotation of said post.

3. In combination with steering gear that includes a rudder post and hydraulic operating means therefor, said operating means including controls to vary the quantity and the direction of flow of liquid therefrom, a steering wheel, a motion transmitting device connected to both said wheel and said post to be operated by movement of either said wheel or said post, a rotatable gear segment carried by said device, a circular track carried by said device and having an indentation aligned with the medial portion of said segment, a gear sector engageable with said segment, a roller carried by said sector to bear on said track and adapted to lie in said indentation when said sector is in neutral position, a lever pivotally mounted intermediate its ends and having a slot in each end, a crank arm connected to said gear sector having a laterally turned portion disposed in one of said slots, a slidable member on which said lever is carried, means connected to said hydraulic operating means to move said slidable member in one direction, means to restrain movement of said slidable member by pressures in said hydraulic means below a predetermined magnitude, a second gear sector operatively mounted adjacent the other slot in said lever, a member fixed on said second sector and extending into the said other slot, and means operatively connecting said second gear sector with said hydraulic means whereby the quantity or direction of flow of liquid in said hydraulic means is controlled.

4. In combination with steering gear that includes a steering wheel, a rudder post and hydraulic operating means therefor; a motion transmitting device connected to both said wheel and said post to be operable by movement of either, a member connected to said device to be driven thereby to a limited degree and having a neutral position with respect to said device, means to prevent the return of said member when displaced from said neutral position and tending to prevent casual movement of said member from said position, and mechanism connecting said member to said hydraulic means to control the operation of said hydraulic means, said mechanism comprising a lever having a movable fulcrum and means responsive to pressure in said hydraulic means to move said fulcrum when said pressure exceeds a predetermined magnitude.

5. In combination with steering gear that includes a steering wheel, a rudder post and hydraulic operating means therefor; a motion transmitting device connected to both said wheel and said post to be operable by movement of either, a member connected to said device to be driven thereby to a limited degree and having a neutral position with respect to said device, means to prevent the return of said member when displaced from said neutral position and tending to prevent casual movement of said member from said position, and mechanism connecting said member to said hydraulic means to control the operation of said hydraulic means, said mechanism comprising a lever having a movable fulcrum, means responsive to pressure in said hydraulic means to move said fulcrum, and means to restrain such movement at pressures below a predetermined magnitude.

6. In combination with steering gear that includes a steering wheel, a rudder post and hydraulic operating means therefor; a motion transmitting device connected to both said wheel and said post to be operable by movement of either, a member connected to said device to be driven thereby to a limited degree and having a neutral position with respect to said device, means to prevent the return of said member when displaced from said neutral position and tending to prevent casual movement of said member from said position, and mechanism connecting said member to said hydraulic means to control the operation of said hydraulic means, said mechanism comprising a lever, and means responsive to pressure in said hydraulic means bodily to move said lever at pressures above a predetermined magnitude and thereby change the mechanical advantage of said lever.

7. In combination with steering gear that includes a steering wheel, a rudder post and hydraulic operating means therefor; a motion transmitting device connected to both said wheel and said post to be operable by movement of either, a member connected to said device to be driven thereby to a limited degree and having a neutral position with respect to said device, means to prevent the return of said member when displaced from said neutral position and tending to prevent casual movement of said member from said position, and mechanism connecting said member to said hydraulic means to control the operation of said hydraulic means, said mechanism comprising a lever having a movable fulcrum and means responsive to pressure in said hydraulic means to move said fulcrum when said pressure exceeds a predetermined magnitude, and means responsive to pressure in said hydraulic means to move said lever at pressures above a predetermined magnitude in such manner as to change the mechanical advantage of said lever.

8. In combination with steering gear that includes a steering wheel, a rudder post and hydraulic operating means therefor having means to control the delivery of fluid by said hydraulic means; a motion transmitting device connected to both said wheel and said post to be operable by movement of either, a member operatively connected to said hydraulic means to be moved by pressure in said hydraulic means when said pressure exceeds a predetermined magnitude and mechanism connecting said device and the control means of said hydraulic means including an element carried by said member to be movable therewith and so related to said device and to said control means that movement of said member varies the degree of actuation of said control for a given magnitude of movement of either said wheel or said post.

9. In combination with steering gear that includes a steering wheel, a rudder post and hydraulic operating means therefor, said operating means having control mechanism to govern the output thereof; a motion transmitting device connected to both said wheel and said post to be operable by movement of either, a gear segment carried by said device, a track carried by said device and having an indentation aligned with the medial portion of said segment, an element pivoted intermediate its ends having at one end a gear sector adapted to engage said segment and at its other end a second gear sector, a roller carried by said element to bear on said track and adapted to lie in said indentation when in neutral position, and means engaged by said second sector and connected to the said control mechanism of said hydraulic means.

10. In combination with steering gear that includes a steering wheel, a rudder post and hydraulic operating means therefor, said operating means having control mechanism to govern the output thereof; a differential device connected to both said wheel and said post to be actuated by movement of either, a gear segment carried by said device, an arcuate track carried by said device and having an indentation therein aligned with the median portion of said segment, a gear sector engageable with said segment, a roller carried by said sector to bear against said track and adapted to lie in said indentation when said sector is in neutral position, and a second gear sector operatively connected to the first mentioned sector and to the said control mechanism of said hydraulic means.

11. In combination with rudder mechanism and hydraulic actuating means connected thereto, a pump connected to supply fluid under pressure to said actuating means, said pump having controls to vary the quantity and the direction of flow of liquid therefrom, a steering wheel, differtial gear means operable by said wheel, a follow-up connection between said rudder mechanism and said differential gear means, mechanism to actuate the controls of said pump including a lever having a variable effective length, and means responsive to the pressure of the fluid being delivered to the hydraulic actuating mechanism to vary the effective length of said lever and connecting means between said lever and said differential gear means adapted to be actuated by said differential means during a predetermined degree of movement of said differential means and thereafter be not actuated so long as the movement of said differential means continues in the same direction.

12. In combination with rudder mechanism and hydraulic actuating means connected thereto, a pump connected to supply fluid under pressure to said actuating means, said pump having controls to vary the quantity and the direction of flow of liquid therefrom, a steering wheel, differential gear means operable by said wheel, a follow-up connection between said rudder mechanism and said differential gear means, mechanism to actuate the controls of said pump including a lever having a variable effective length and means responsive to the pressure of the fluid being delivered to the hydraulic actuating mechanism to vary the effective length of said lever and connecting means between said lever and said differential gear means comprising an intermittent gear device.

13. In combination with rudder mechanism and hydraulic actuating means connected thereto, a pump connected to supply fluid under pressure to said actuating means, said pump having controls to vary the quantity and the direction of flow of liquid therefrom, a steering wheel, differential gear means operable by said wheel, a follow-up connection between said rudder mechanism and said differential gear means, mechanism to actuate the controls of said pump including a lever having a variable effective length and means responsive to the pressure of the fluid being delivered to the hydraulic actuating mechanism to vary the effective length of said lever and connecting means between said lever and said differential gear means comprising a device to delay the return of the controls of said pump to the neutral position by said follow-up.

14. In combination with rudder mechanism and hydraulic actuating means connected thereto, a pump connected to supply fluid under pressure to said actuating means, said pump having controls to vary the quantity and the direction of flow of liquid therefrom, a steering wheel, differential gear means operable by said wheel, a follow-up connection between said rudder mechanism and said differential gear means and means including an intermittent gear operably connecting the controls of said pump to said differential means to prevent the output of said pump from rising above a predetermined maximum and to delay the return of said controls to the neutral position by said follow-up.

15. In combination with rudder mechanism and hydraulic actuating means connected thereto, a pump connected to supply fluid under pressure to said actuating means, said pump having controls to vary the quantity and the direction of flow of liquid therefrom, a steering wheel and means, including a lever of variable effective length and also including mechanism responsive to the pressure of the output of said pump connected to vary the effective length of said lever, operatively connecting said wheel to the controls of said pump to permit moving said wheel to move said rudder mechanism to any desired rudder angle while preventing the said output from rising above a predetermined maximum.

16. In combination with rudder mechanism and hydraulic actuating means connected thereto, a pump operatively connected to supply fluid under pressure to said actuating means, said pump having controls to vary the quantity and the direction of flow of liquid therefrom, a steering wheel, means responsive to the pressure of the output of said pump, a lever carried by the last mentioned means, said lever being operatively connected to the controls of said pump and adapted to have its effective length varied by said pressure responsive means and means including an intermittent gear operatively connecting said lever to said wheel.

17. In combination, a member movable about an axis, a differential gear mechanism, a small number of gear teeth carried by a portion of said mechanism, a gear sector engageable with said teeth, a device for transmitting fluid under pressure to actuate said movable member, said device having controls to vary the quantity and direction of flow of liquid therefrom, a member movable in response to the pressure of the output of said device, a lever carried by said last mentioned member and adapted to have its effective length varied by movement of said last mentioned member, means connecting the controls of said device to said lever, means connecting said lever and said gear sector, follow-up mechanism connecting the first mentioned member and the differential mechanism and means to actuate said differential mechanism.

18. In combination, a member movable about an axis, a differential gear mechanism, a device for transmitting fluid under pressure to actuate said rotatable member, said device having controls to vary the quantity and direction of flow of liquid therefrom, a member movable in response to the pressure of the output of said device, a lever carried by the last mentioned member and adapted to have its effective length varied by movement of said last mentioned member, means connecting the controls of said device to said lever and means connecting said lever to said differential gear mechanism, said last mentioned connection including elements causing or permitting actuation of the means connected to said control during a portion only of the movement of said mechanism.

19. In combination, a member movable about an axis, follow-up mechanism connected to said member, means to move said member, controls to govern the application of force to said member by said means and means to actuate said controls, said last mentioned means being operable manually and also connected to said follow-up and adapted to be acted upon simultaneously in opposite senses by said follow-up and by manual operation and comprising devices to actuate said controls during the initial portion only of that operation of said last mentioned means which moves the said controls away from their neutral position and during the final portion only of that operation which moves said controls toward their neutral position.

20. In combination with rudder mechanism and hydraulic actuating means connected thereto, a pump connected to supply fluid under pressure to said actuating means, said pump having controls to vary the quantity and the direction of flow of liquid therefrom, a steering wheel and means including a pivotally mounted lever so connected to the parts coacting therewith as to have a variable effective length and also including mechanism responsive to the pressure of the output of said pump connected to vary the effective length of said lever, operatively connecting said wheel to the controls of said pump to permit moving said wheel to move said rudder mechanism to any desired rudder angle while preventing the said output from rising above a predetermined maximum.

21. In combination with rudder mechanism and hydraulic actuating means connected thereto, a pump connected to supply fluid under pressure to said actuating means, said pump having controls to vary the quantity and the direction of flow of liquid therefrom, a steering wheel and means including a lever continuously mechanically connected to the parts coacting therewith so as to have a variable effective length and also including mechanism responsive to the pressure of the output of said pump connected to vary the effective length of said lever, operatively connecting said wheel to the controls of said pump to permit moving said wheel to move said rubbed mechanism to any desired rudder angle while preventing the said output from rising above a predetermined maximum.

22. In combination, a variable delivery pump, said pump having controls to vary the quantity and direction of flow of liquid therefrom, manual operating means including a lever continuously mechanically connected to the parts coacting therewith so as to have a variable effective length and also including mechanism responsive to the pressure of the output of said pump connected to vary the effective length of said lever, operatively connecting said manual means to the controls of said pump to permit moving said means to any desired extent while preventing the said output from rising above a predetermined maximum, the said control being actuated during only the initial part of the operation of said means in a direction to move said control away from neutral and during the final part of the operation thereof in a direction to move said controls toward neutral.

RALPH ERLING.